United States Patent [19]

Weisser

[11] 3,813,672

[45] May 28, 1974

[54] AUTOMATICALLY CONTROLLED DIGITAL VHF DIRECTION FINDER

[76] Inventor: Werner Weisser, Huetlingstrasse 9, 7750 Konstanz, Germany

[22] Filed: Aug. 7, 1972

[21] Appl. No.: 278,705

Related U.S. Application Data

[63] Continuation-in-part of Ser. No. 35,501, May 7, 1970, abandoned.

[30] Foreign Application Priority Data

May 7, 1969 Germany............................ 1923351

[52] U.S. Cl............................ 343/113 R, 324/83 D
[51] Int. Cl............................................. G01s 3/48
[58] Field of Search........ 343/113 R, 120; 324/83 D

[56] References Cited
UNITED STATES PATENTS 2,284,475  5/1942  Plebanski........................... 343/120
3,663,956  5/1972  Purdy et al. ...................... 324/83 D Primary Examiner—Richard A. Farley
Assistant Examiner—Richard E. Berger
Attorney, Agent, or Firm—Waters, Roditi, Schwartz & Nissen

[57] ABSTRACT

An automatically controlled digital VHF direction finding apparatus provided with two parallel antennae alternatively connected by a switch to a common receiving channel which produces an output signal to control the generation of a digital signal representing the phase difference between voltages induced in the antennae due to their being separated in space. The time interval is determined between two voltage points of equal value in the voltage generated in one antenna and between a given voltage point of the voltage generated in said one antenna and a voltage point of equal voltage of the voltage generated in the other antenna. A third antenna can be employed to increase the base of operation and for purposes of providing an error correcting signal, a cable of fixed length can be introduced into the circuits to provide a known increase of transit time.

3 Claims, 6 Drawing Figures

AUTOMATICALLY CONTROLLED DIGITAL VHF DIRECTION FINDER

OTHER APPLICATIONS

This Application is a continuation-in-part of my earlier Application, Ser. No. 35,501 filed May 7, 1970, now abandoned.

BACKGROUND

1. Field of Invention

This invention relates generally to radio direction finders and more particularly to improved direction finding systems of a type which functions by comparing the time of arrival or phases of a transmitting signal or electromagnetic wave at multiple antennae arranged in spaced relation.

2. Prior Art

For the V.H.F.-band, antenna elements have sizes in the order of the associated wavelengths and simple dipoles with or without reflectors are known for use in direction finders, as well as dipole arrays or groups of dipoles or rod antennae operating with generated voltages or varying phase.

Direction finders are known which are provided with visual indications such as, for example, with phase and component comparisons displayed by cathode-ray tubes. These require substantial expenditures since two receiving channels with equal phase and response magnification characteristics are necessary.

Direction finders are also known which are provided with wide-aperture antennae (VDF). These also require two receivers and a circular antenna array of 10 dipoles or more. Other direction finders are known having multiple antenna systems only needing a single receiver. These operate mostly with an antenna switch and a switch for the intermediate frequency, both switches being synchronized. Both intermediate frequency waves are stored and compared by means of phase discriminators.

SUMMARY OF THE INVENTION

It is an object of the invention to provide an improved direction finder which can operate automatically, especially when airborne in aircraft. Therein, the direction indication should be obtained automatically without the need for any manual operations.

Another object of the invention is to provide improved equipment intended to serve as a navigational aid for aircraft in general, whereby existing V.H.F. airborne communication equipment can be used for direction finding during communications, especially with small airports and aircraft. Nearby communications should not be disturbed thereby.

The present invention covers a V.H.F. direction finder having digital evaluation, whereby the voltages of two or more separated antennae are alternatively connected by means of switches to a receiver in rapid succession, in which receiver the phase deviations of the intermediate frequency, with which the direction of the incoming high frequency wave is found, are determined from the intermediate frequency phase deviations by means of a digital-electronic time measuring device.

DETAILED DESCRIPTION

Figure 2:
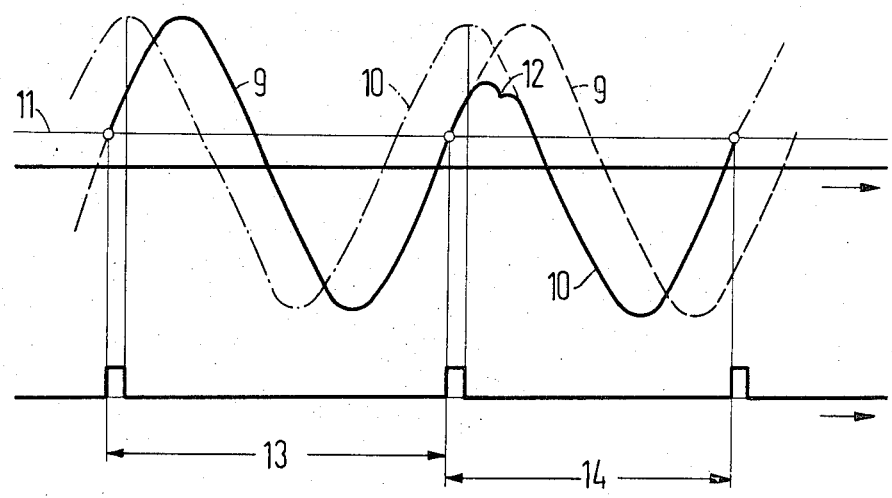
FIG. 2 illustrates a voltage curve for the antennae of FIG. 1.

The direction finder of the invention is a system wherein, in order to measure phase difference with a common receiver input channel 5, the time interval is determined between two voltage points of equal value in the voltage curves (FIG. 2) of a first antenna 1 and between a given voltage point of the first antenna 1 and a voltage point of equal magnitude of a second antenna 3 which is switched to the receiving channel 5 in place of the first antenna 1. The voltage of the intermediate frequency of receiver 5 is fed to a sensor (for instance a sensing amplifier for null indication) which produces a trigger impulse at all points of the voltage curve which have the same value and direction (i.e., increasing or decreasing).

Figure 1:
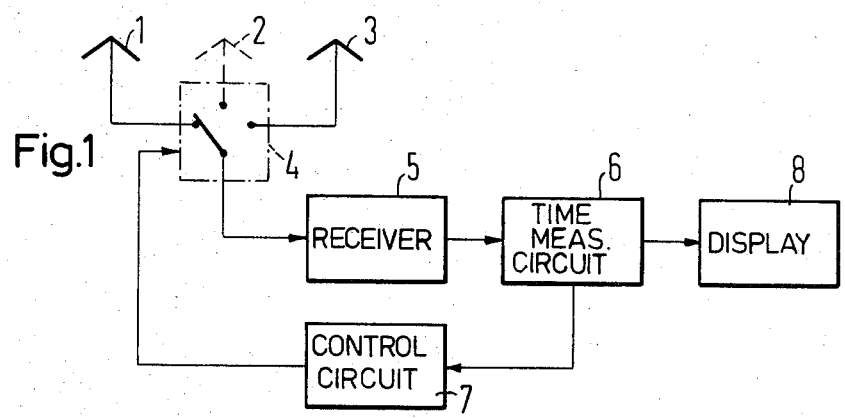
FIG. 1 is a block diagram showing two (or possibly three) antennae, an antenna switch, a radio receiver, an electronic time measuring device, a control circuit for the antenna switch and a display device, arranged in accordance with the invention.

In FIG. 1, block 6 is a time measuring device, block 8 is a display device, block 4 is the antenna switch and block 7 a control circuit for the antenna switch.

The time interval is obtained according to a conventional digital time measuring method. The first input trigger-pulse is used to open a gate. A crystal-oscillator signal is converted into pulses and these are passed through the gate into a counter. The number of pulses recorded and stored is proportional to the length of time the gate is open.

The antenna switch 4 of FIG. 1 is not operated at first. In this case, the time measuring device determines the periodic time 9 (FIG. 2) of the intermediate frequency and stores this time value as the counter reading in electronic-digital form.

The method of determining, in accordance with the invention, horizontal direction (QDR) of arrival of a transmitted wave base on the different phases of the voltages generated in two space-separated receiving antennae, defined as a system, comprises a technique to measure the phase difference with a common receiver input channel. Therein, the time interval is determined between two voltage points of equal value on the voltage curve 9 of the first antenna 1 and between a given voltage point of the first antenna 1 and a voltage point of equal magnitude on the curve 10 of the second antenna 3 which is switched to the receiving channel 5 in place of the first antenna 1.

In said method, the two antennae 1, 3 are arranged in parallel with each other at a distance less than half the wave length involved and are alternatively connected to the common receiver input channel by means of electronically controlled switch 4. The high or intermediate frequency (curve 3) of the receiver output channel is connected to an electrical digital time measuring device 6. The time measuring device 6 is controlled so that it measures the time interval between equal conditions with respect to phase of the input waves. The electronically controlled switch 4 is operated by means of a suitable control circuit 2 immediately after each second phase reference point has been reached.

After passing the second point of reference, switch 4 is operated, as has been noted, and connects the other antenna 3 to the receiver. The second time interval 14 differs from the periodic time 13 of the intermediate frequency since the intermediate frequency voltage 3 follows from the phase conditions of the antenna.

The difference between both time intervals is determined in a conventional electronic-digital manner. This time difference is a measure of the phase deviation.

Figure 3:
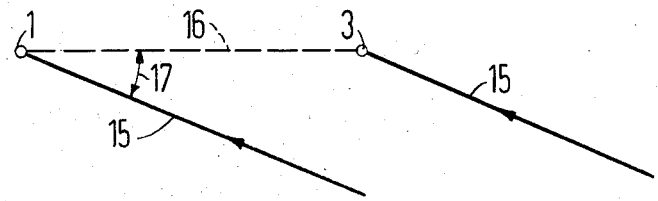
FIG. 3 diagrammatically illustrates an antenna system consisting of two vertical dipoles and also illustrates the angle of arrival of one wave and the direction of arrival of the wave.

According to FIG. 3, the antenna system consists of two vertical dipoles (1 and 3) at a distance of approximately one-tenth to one-half of the received wave length. If the angle 17 of arrival $\phi$ (phi) of the received wave is defined as the angle between the connecting line 16 of the antennae 1 and 2 and the direction of arrival of the wave 15, it follows that:

Phase deviation $\alpha = \cos 360\ S/\lambda$ wherein
$S$ = distance between antennae 1 and 3
$\lambda$ = wavelength This means that the above-determined time difference is also a measure of the direction of the arriving wave.

In order to avoid transient phenomena in the receiving channel due to antenna switching interfering with the measurement, the time interval 14 of measurement is extended by a known amount, for instance by a complete period of the intermediate frequency. This time extension is taken into account and cancelled out when determining the time difference.

A third antenna 2 (FIG. 1) can be used for rotating electrically the base of the direction finder measuring device in order to extend the single-valued working range to an azimuth angle of 360°.

In order to extend the single-valued working range to an azimuth angle of 360° as indicated above, the third antenna 2 is installed for rotating electrically the base of the direction finder by selecting alternatively two of the three antennae 1, 2 or 3 for the measurement.

Figure 4:
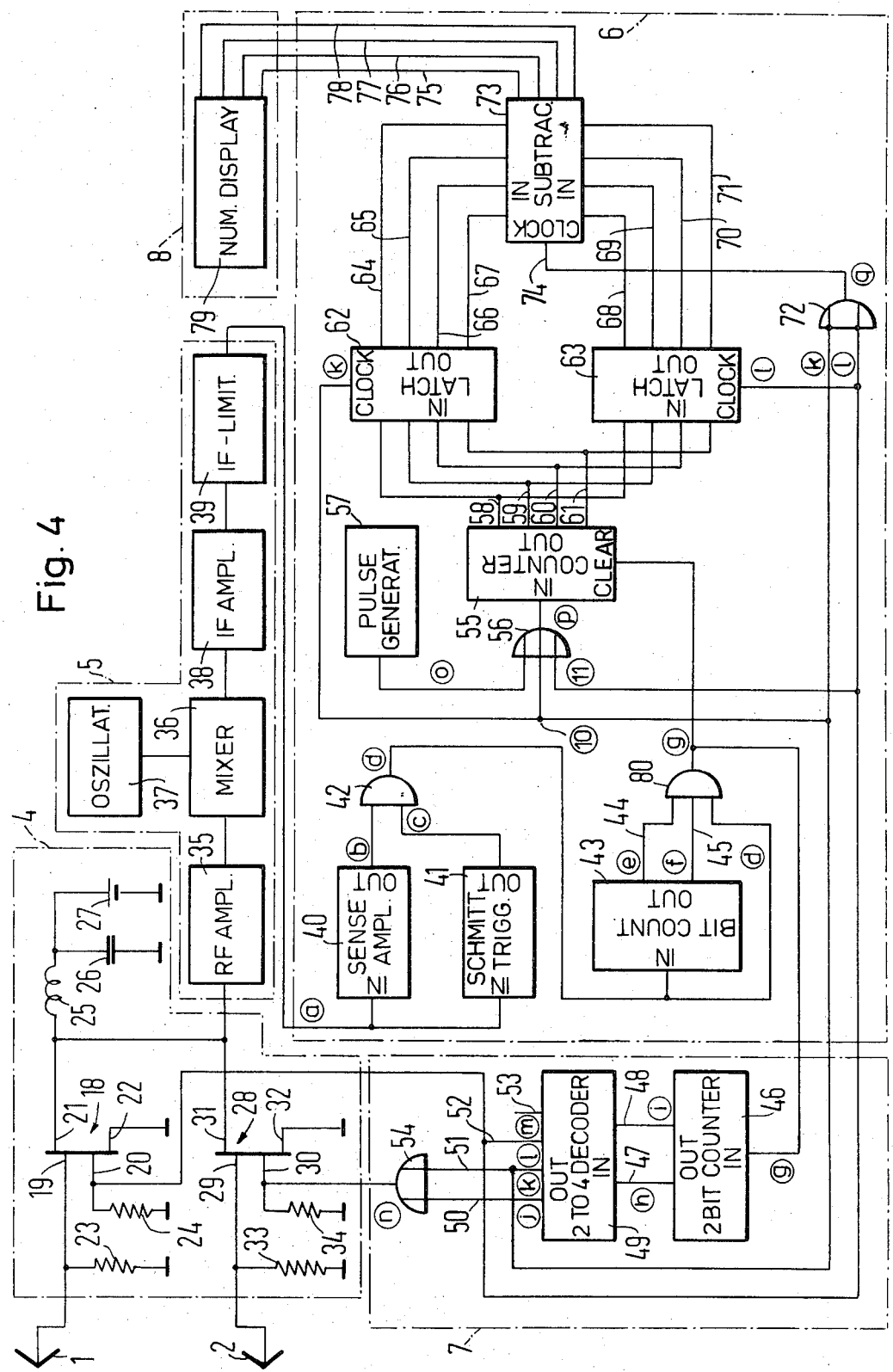
FIG. 4 is a detailed block diagram of the device shown in simplified form in FIG. 1.
Figure 5:
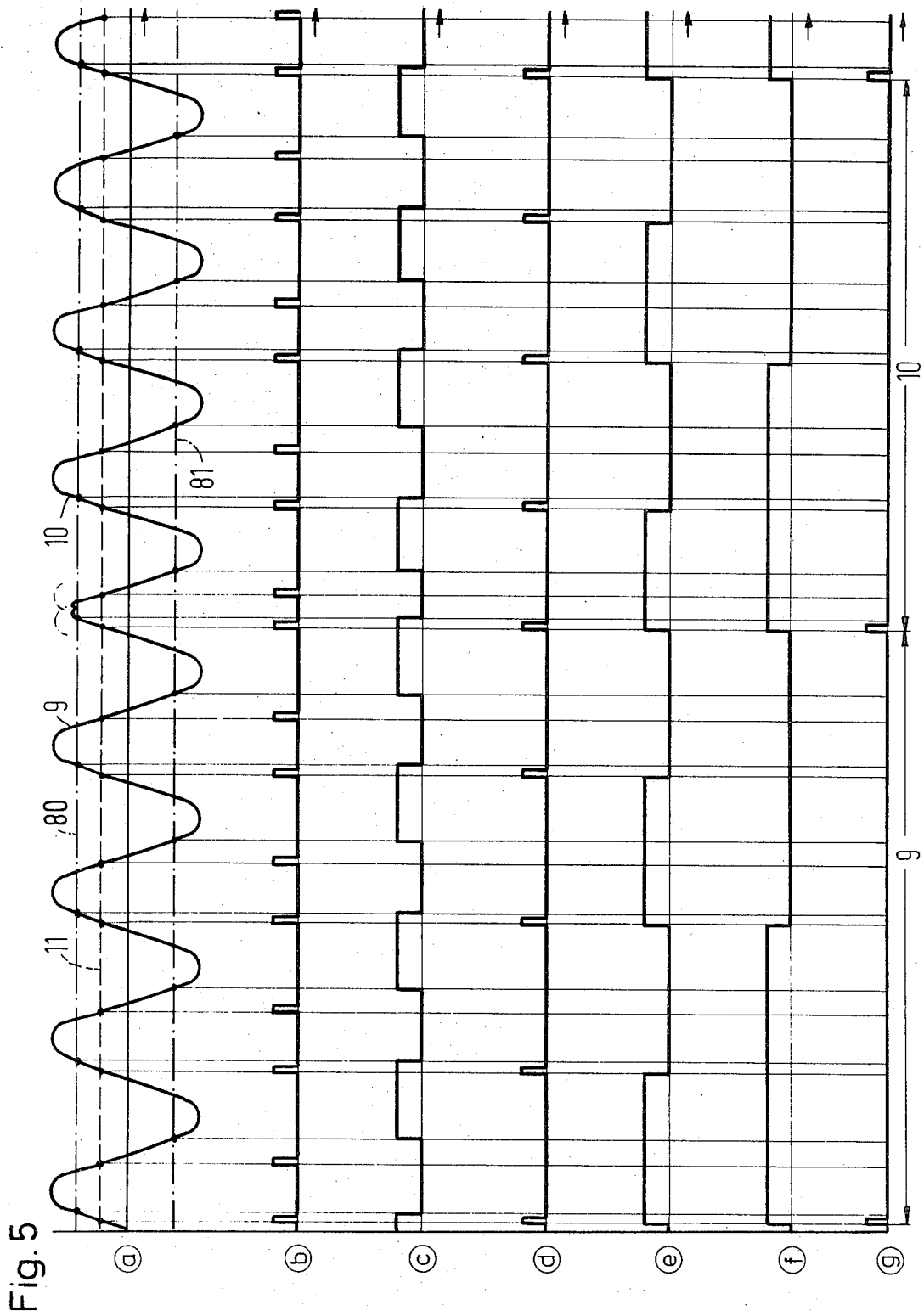
FIGS. 5 and 6 are pulse diagrams of the voltages at various points of the device shown in FIG. 4.
Figure 6:
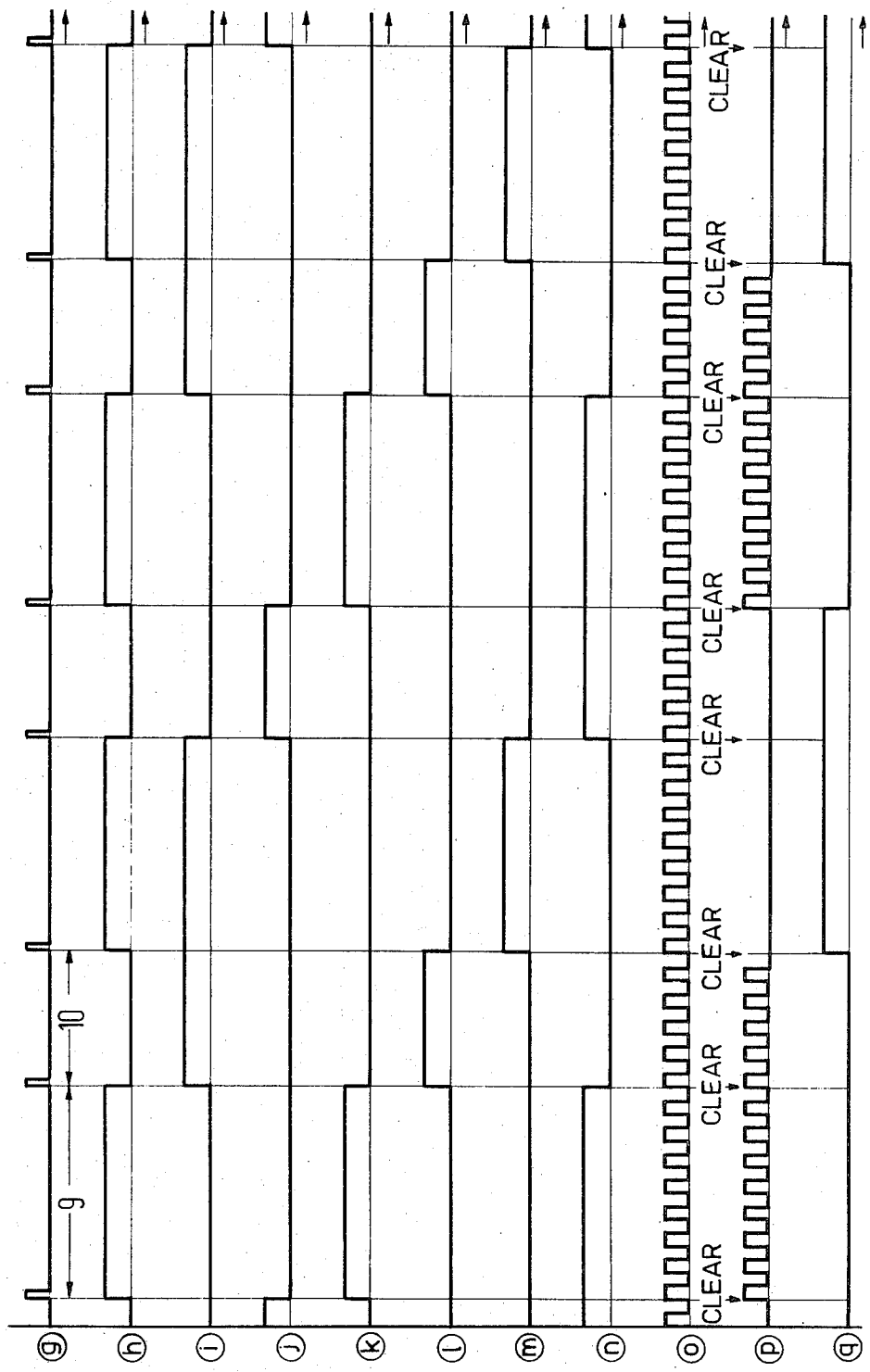

The function of the device will be explained once more in a greater detail with reference to the detailed block diagram in FIG. 4 and the wave form diagrams in FIGS. 5 and 6.

The switch 4 is provided with two field effect transistors 18 and 28. The field effect transistor 18 is provided with two gate electrodes 19 and 20. The gate electrode 19 is connected to the antenna 1. Moreover, one end of the resistor 20 is connected with the gate electrode 19, the other end of the resistor 23 being attached to ground. In a similar manner, one end of a resistor 24 is connected with the gate electrode 20, the other end of the resistor 23 being attached to ground. Both said resistors 23 and 24 serve as grounding resistors for the high-resistant gate inputs of the field effect transistor 18.

The collector electrode 21 of the field effect transistor 18 is connected with the positive terminal of a battery 27 by means of an inductance 25. A capacitor 26 is arranged in parallel to the battery 27. The inductance 25 and the capacitor 26 form a filter member which prevents the high frequency at the collector electrode 21 from escaping to ground. The emitter electrode 22 of the field effect transistor 18 is connected to ground.

In a similar manner, the field effect transistor 28 is also provided with two gate electrodes 29 and 30. The gate electrode 29 is connected to the antenna 2. Moreover, the gate electrode 29 is connected to ground by means of a resistor 33. The gate electrode 30 is connected to ground via a resistor 34. Both said resistors 33 and 34 serve as grounding resistors for the high-resistance gate inputs 29 and 30. The collector electrode 31 of the field effect transistor 28 is connected with the collector electrode 21 of the field effect transistor 18. The emitter electrode 32 of the field effect transistor 28 is grounded.

The collector electrodes 21 and 31 of the both field effect transistors 18 and 28 are connected to the input of the receiver 5. The input of the receiver 5 is formed by a high frequency amplifier 35. The output of the high frequency amplifier 35 is connected to the input of a mixer 36. The other input of the mixer 36 is connected with a local oscillator 37. The mixer produces an intermediate frequency signal, which is fed into an intermediate frequency amplifier 38. The output of the intermediate frequency amplifier 38 is connected with the input of an intermediate frequency limitator 39. The output of the intermediate frequency 39 coincides with the output of the receiver 5.

The output of the receiver 5 is connected to the input of time measuring circuit 6. The input of the time measuring circuit is formed by a sensing amplifier 40 and a Schmitt trigger 41. The inputs of the amplifier 40 and of the Schmitt trigger 41 are connected in parallel. The output of the amplifier 40 is attached to one of the inputs of an AND-gate 42. The output of the Schmitt trigger 41 is connected to the other input of the AND-gate 42. The output of the AND-gate 42 is connected to the input of a 2-bit counter 43. The both outputs 44 and 45 and the input of the 2-bit counter 43 are connected with an AND-gate 80. The output of the AND-gate 80 is connected with the input of the control circuit 7.

A further 2-bit counter 46 is provided at the input of the control circuit 7. The input of this 2-bit counter 46 is connected with the output of the AND-gate 80 of the time measuring circuit 6. Both outputs 47 and 48 of the 2-bit counter 46 are connected to both inputs of a 2-to-4 decoder 49. The outputs 50 and 51 of the 2-to-4 decoder 49 are connected to the both inputs of an OR-gate 54. The output of the OR-gate 54 is connected to the second gate connection 30 of the field effect transistor 28. The third output 52 of the 2-to-4 decoder 49 is connected to the second gate connection 30 of the field effect transistor 18. The fourth output 53 of the 2-to-4 decoder is not in use.

Furthermore, the first output 50 and the second output 51 of the 2-to-4 decoder 49 are connected each to one input of an OR-gate 56 in the time measuring circuit 6. A third input of the OR-gate 56 is connected with the output of a quartz-controlled pulse generator 57. The output of the OR-gate 56 is connected to the input of a counter 55.

The counter 55 changes the number of serial pulses, which are transmitted by the OR-gate 56 into dual information. For instance, the $2^0$ output is designated by numeral 58, the $2^1$ output by numeral 59, the $2^2$ output by numeral 60 and the $2^3$ output by numeral 61. The number of parallel outputs of the counter 55 depends on the maximum number of pulses which are to be transmitted by the OR-gate 56 and to be counted by the counter 55. The counter 55 is furthermore provided with a clear-input, which is connected with the output of the AND-gate 80.

Two storage circuits 62 and 63 are attached to the four outputs of the counter 55, which storage circuits, in the present example, are also provided with four inputs and with four outputs. This means that parallel binary informations are fed into the storage circuits 62 and 63. The storage circuits 62 and 63, however, are activated for acceptance of new information only in the case that a corresponding control pulse is provided on their clock input. Thus, the clock input of the storage 62 is connected with the output 51 of the 2-to-4 decoder 49. The clock input of the storage 63 is connected to the output 52 of the 2-to-4 decoder 49.

The four binary outputs 64, 65, 66 and 67 of the storage 62 are connected with the corresponding inputs of a subtraction circuit 73. The four binary outputs 68, 69, 70 and 71 of the storage 63, in a similar manner, are connected to the corresponding inputs of the subtraction circuit 73. The subtraction circuit 73 subtracts the binary numbers fed into it from both storages 62, 63 and presents the difference on four parallel outputs 75, 76, 77 and 78, also in a binary form. However, the subtraction circuit is only activated when a control pulse of corresponding magnitude is present on its clock input 74. The clock input 74 is connected with the output of a NOR-gate 72. The NOR-gate 72 has two inputs. One of the inputs of the NOR-gate 72 is connected to the output 51 of the 2-to-4 decoder 49. The other input of the NOR-gate 72 is connected to the output 52 of the 2-to-4 decoder 49.

The four binary outputs 75, 76, 77 and 78 of the subtraction circuit 73 are connected with corresponding four binary inputs of a numerical indication device 79. This numerical indication device 79 changes the dual informations fed into its inputs in a decimal number. The decimal number is indicated, for instance, by means of numerical tubes.

The function of the apparatus shown in FIG. 4 will now be explained in greater detail with reference to the pulse diagram shown in FIGS. 5 and 6.

The trains of waves which are received by the antennae 1 and 2 are fed to the inputs of the both gate electrodes 19 and 29 of both field effect transistors 18 and 28. Both field effect transistors 18 and 28 are alternatively operated by the control circuit 7. In order to achieve this, a positive pulse is fed to the respective gate electrode 20 or 30, as will be explained later. The high frequency signal is transmitted from the collector electrode 21 of the field effect transistor 28, respectively from the collector electrode 31 of the field effect transistor 28, to the input of the high frequency amplifier 35. The high frequency amplifier 35 amplifies the high frequency signal. In the mixer 36, the high frequency signal is changed in an intermediate frequency signal. The intermediate frequency signal is amplified in the intermediate frequency amplifier 38, and limited in the limitator 39 in order to eliminate the influence of the field strength variations.

The output signal of the intermediate frequency limitator 39 is shown in FIG. 5(a). It practically corresponds to the signal shown in FIG. 2. The only difference is to be seen in the fact that the switch-over does not occur after each intermediate frequency cycle, but only after several intermediate frequency cycles. The purpose of this is to limit the influence of transient phenomenon on the measuring result to an insignificant value. When the field effect transistor 18 is switched on, there results on the output of the intermediate frequency limitator 39 the train of waves 9. When the field effect transistor 28 is switched on, there results on the output of the intermediate frequency limitator 39 the train of waves 10. When the device is switched over from the train of waves 9 to the train of waves 10, there results a jump as a result of the delay of the high frequency waves on their way between the antennae 1 and 2.

The sensing amplifier 40 works as follows:
Each time when the train of waves 9 or 10 reaches a certain threshold potential 11, the amplifier 40 produces a signal or pulse. The pulse series produced on the output of the amplifier 40 is illustrated in FIG. 5(b).

The Schmitt-trigger 41 produces rectangular pulses, which are shown in FIG. 5(c). The ascending edge, i.e., the pulse beginning, is located where the train of waves 9 or 10 decreases below a negative threshold potential 81. The descending edge, i.e. the end of the pulse, is located where the train of waves 9 or 10 increases above a positive threshold potential 80.

The output signal of the AND-gate 42 is shown in FIG. 5(b). The AND-gate transmits only those pulses of the pulse train shown in FIG. 5(b), which coincide with the rectangular pulses of the train of pulses shown in FIG. 5(c). In practice, this means that only those pulses of the pulse train shown in FIG. 5(b) are transmitted, which are produced by the sensing amplifier 40, when the ascending edge of the wave train 9 or 10 reaches the positive threshold potential 11.

The pulses resulting on the outputs 44 and 45 of the 2-bit counter 43 are illustrated in FIGS. 5(e) and 5(f). Only if pulses are present simultaneously at the input of the 2-bit counter 43 and at its both outputs 44 and 45, a pulse results at the output of the AND-gate 80. This means that the AND-gate 80 transmits only each fourth one of the pulses fed to the input of the 2-bit counter 43.

The pulse series resulting on the output of the AND-gate 88 is shown in FIG. 5(g). Moreover, this pulse series is shown in a shortened time scale in FIG. 6(g). It can be seen that the distance 9 or 10 of two immediately subsequent pulses is non-uniform. This different distance is a result of a switch-over from one antenna to the other.

The output pulses of the AND-gate 80 are fed into the control circuit 7. Further 2-bit counter 46 is located at the input of the control circuit 7. The pulse series resulting on the both outputs 47, 48 of the 2-bit counter 46 are illustrated in FIGS. 6(h) and 6(i).

From the both pulse series illustrated in FIGS. 6(h) and 6(i), the 2-to-4 decoder 49 produces at its outputs 50, 51, 52 and 53 four pulse series, which are shown in the FIGS. 6(j), 6(k), 6(l) and 6(m).

A sum pulse series is formed from the both pulse series illustrated in the FIGS. 6(j) and 6(k), by means of an OR-gate 54, which sum is shown in FIG. 6(n). A field effect transistor 28 is scanned by this sum pulse series. Contrarily to this, the field effect transistor 18 is scanned by the pulse series illustrated in FIG. 6(l).

The pulse series illustrated in FIG. 6(k) and 6(l) is fed into the OR-gate 56 in the time measuring circuit 6. Moreover, one more pulse series, illustrated in FIG. 6(o), is fed into the OR-gate 56, which series is produced by a quartz controlled pulse generator 57. The output series of the OR-gate 56 is shown in FIG. 6(p).

The counter 55 counts the number of the pulses shown in FIG. 6(p), up to the next clear signal. This comes from the output of the adding circuit 80. The clear pulses are shown in FIG. 6(g). After a clear pulse, the counter 55 starts counting anew. The result of counting is given by the counter 55 in a binary form at its four outputs 58, 59, 60 and 61. It is to be noted once more that the number of outputs of the counter 55 depends on the number of the pulses which are maximally to be counted.

The storage 62 is only activated if the pulses shown in FIG. 6(k) are fed to its clock input. The storage 63 is only activated if the pulses shown in FIG. 6(l) are fed to its clock input. The pulses of the pulse series shown in FIG. 6(k) and the pulses of the pulse series shown in FIG. 6(l) occur immediately in succession. When no pulse is fed to both clock inputs of the both storages 62 and 63, then the storages 62 and 63 store the latest given binary number. The binary number is available at request at its outputs 64 to 67, or 68 to 71.

The subtraction circuit 73 produces the difference of the both binary numbers fed into it only in the case when the pulses illustrated in FIG. 6(q) are fed to its clock input 74. The pulses shown in FIG. 6(q) occur only when the pulses shown in FIGS. 6(k) and 6(l) do not occur. This means that the subtraction circuit 73 only produces the difference, if none of the both storages 62, 63 is supplied with a new binary number.

The difference produced by the subtraction circuit 73 is also made available at its four outputs 75–78 in binary form, but it is shown by the numerical indication device 79 in a decimal form. The indicated decimal number is proportional to the differing time gap 9, 10 between the pulses shown in the FIGS. 5(g) and 6(g). This different time distance is connected again — as it has already been mentioned - with the angle of the incoming trains of waves.

The computation between the incoming angle and the number indicated by the numerical indication device 79 can be accomplished by means of a table of values. However, it is also possible to couple the numerical indication device 79 with a computer unit, which conducts the computation automatically. In this case, the indication device 79 can also be formed so that it does not show numerals, but directly a certain angle in a circular lamp field.

The antenna which 1 is of conventional construction and one possibility is described, for instance, in the RCA publication ST 3529 (application sheet). The publication relates to a switch with a MOS-FET of a type RCA 40673.

The novel system for the antenna switch 1 is described, for instance, in the Texas Instruments-Bulletin CA 101 (application sheet) which refers to the "operations and Use of SN 7520 N Sense Amplifier."

What is claimed is:

1. Apparatus for determining the direction of arrival of electromagnetic waves comprising at least two receiving antennas spaced apart at a distance less than half the wave length of the electromagnetic waves, said waves generating voltages of different phases in said antennas, a single receiver channel means, said channel means having an output; an electrically controlled switch coupled between the antennas and said receiver channel means, said switch alternatively coupling the antennas to the receiver channel means; means to determine sequential phase reference points on the voltage generated in said receiver channel means; control means for the switch connected to the output of the receiver channel means and operating the switch to change over between said antennas immediately after each second determined phase reference point of the voltage generated in the receiver channel means; and an electronic digital time measuring means, the output of the receiver channel means being further connected to said electronic digital time measuring means to measure the time interval between each two reference phase points in the output voltage of the receiver channel means.

2. Apparatus as claimed in claim 1 comprising means for extending the measured time interval to reduce interference resulting from transient phenomena.

3. Apparatus as claimed in claim 1 comprising a third antenna for rotating electrically the base of the measuring means in order to extend the single-valued working range to an azimuth angle of 360°.

* * * * *